May 7, 1968     E. J. KINDLON     3,382,008
ADJUSTABLE TREAD TRACTION DEVICE
Filed July 19, 1966

INVENTOR.
EDWARD J. KINDLON
BY
Walter F. Wessendorf Jr
Attorney

United States Patent Office 3,382,008
Patented May 7, 1968

3,382,008
ADJUSTABLE TREAD TRACTION DEVICE
Edward J. Kindlon, 270 Orange St.,
Albany, N.Y. 12207
Filed July 19, 1966, Ser. No. 566,404
6 Claims. (Cl. 301—47)

ABSTRACT OF THE DISCLOSURE

Adjustable tread traction device utilizable adjacent an automobile tire and wheel, and comprising a mounting bracket having its small leg secured to a wheel stud, its abutment plate abutting the wheel rim open face, its L-shaped hook engaging a wheel hole for adjustable attachment, its upper and lower bracket plates carrying a screw rod in keyed relationship and permitting gravity positioning and retraction of the screw rod radially, relative the wheel and road, its end plate carrying a detent handle rod engaging the screw rod for locked positioning, and the screw rod carrying the tread.

This invention relates to the art of an adjustable tread traction device.

The problem in the art to which this invention apertains is the need for an adjustable tread traction device for utilization adjacent an automobile tire and wheel to provide reliable traction assistance such as when the roads are icy and slippery especially during wintertime driving conditions; the need for an adjustable tread traction device that can be adapted for ease and quickness in mounting and demounting of same from the automobile wheel; the need for an adjustable tread traction device that is radially adjustable relative the automobile wheel and road for varying the degree and amount of frictional engagement or "bite" of the tread depending teeth with the road surface; the need for an adjustable tread traction device that can be carried, without interference, on the automobile wheel ready for emplacing the traction device in position for use when the occasion for its use arises; and the need for an adjustable tread traction device that is adapted to be placed in position for use and likewise is adapted to be returned or retracted from its position of traction use, by merely utilizing the force of gravity, and locking the device in position by turning a handle to cause a detent to engage a detent hole.

The object of this invention is to inclusively solve the problems and needs of the art as have been described and discussed in the preceding paragraph.

This object and other objects of the invention should be discerned and appreciated from the detailed specification taken in conjunction with the drawings, wherein like reference numerals refer to similar elements throughout the several views, in which.

Figure 1:
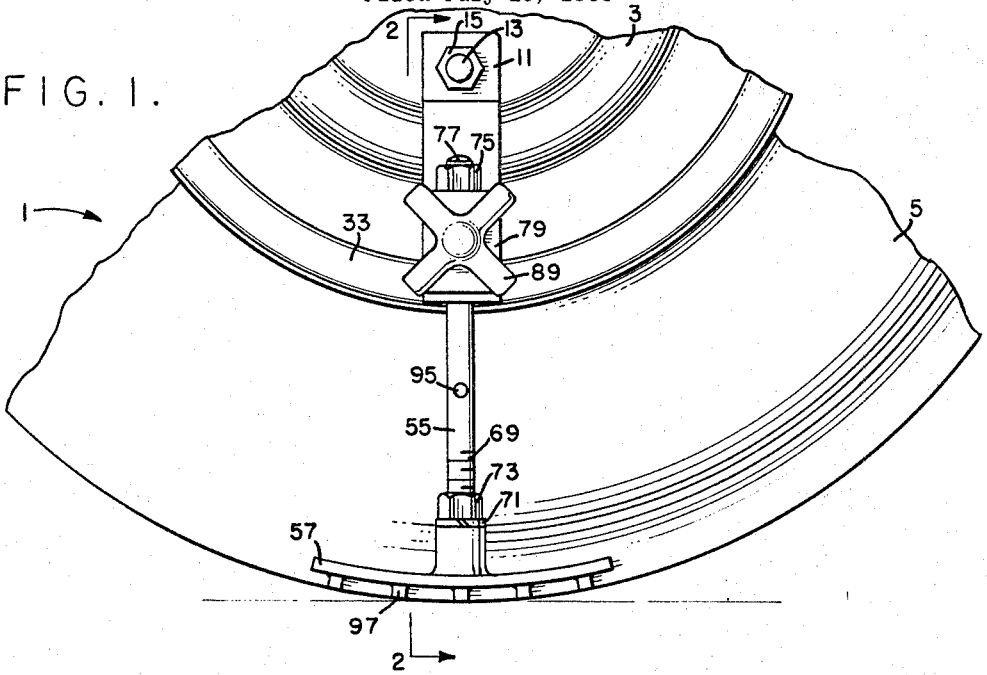
FIG. 1 is a view of an automobile wheel and tire with the adjustable tread traction device placed in position for use.

In FIG. 1 of the drawings, reference numeral 1 generally refers to the invention embodied as an adjustable traction device, and shown mounted on the wheel 3 and adjacent to the open faces of the wheel 3 and pneumatic tire 5.

Traction device 1 has a mounting bracket 7 having a hole 9 formed through its small leg 11 for reception therethrough of wheel stud 13, with securement provided by the engaged lug nut 15. Adjustable attachment and securement of mounting bracket 7 with wheel 3 is effectuated by drilling through the wheel open face 17 a hole 19 aligned with hole 21 formed through mounting bracket 7, engaging small leg 23 of threaded L-shaped hook 25 with open face wheel hole 19, inserting the threaded portion of L-shaped hook 25 through hole 21, and then suitably and adjustably tightening nuts 27, with interposed lock washer 29, engaged on such threaded portion. Further attachment and securement of mounting bracket 7 with wheel 3 is effected by an abutment plate 31 in abutting relationship with the open face 33 of wheel rim 35. Abutment plate 31 is carried on bracket 7 by screw rod 37 inserted through aligned holes 39, 41, 43 formed through respective key plate 45, lower bracket plate 47 and abutment plate 31, with securement provided by means of interposed lock washer 49, and nuts 51 and 53 suitably engaged and tightened on screw rod 37.

The screw rod 55, carrying the tread 57 on one of its threaded ends, is disposed through complemented holes 59 and 61 formed through respective upper bracket plate 63 and lower bracket plate 47. Key 65 of key plate 45 engages key slot 67 formed within screw rod 55. The threaded portion 69 of screw rod 55 is engaged with a tapped hole formed in tread 57 with securement provided by interposed lock washer 71 and engaged nut 73. Screw rod 55 has a nut 75 engage on its threaded terminal portion 77 and thereby functions as a limit stop. The cooperating threaded portion 69 of screw rod 55, tapped hole in tread 57, interposed washer 71 and nut 73 permit radial adjustment and positioning of tread 57 relative to the wheel and road surface for varying the degree and amount of frictional engagement of the tread 57 with the road surface.

Figure 2:
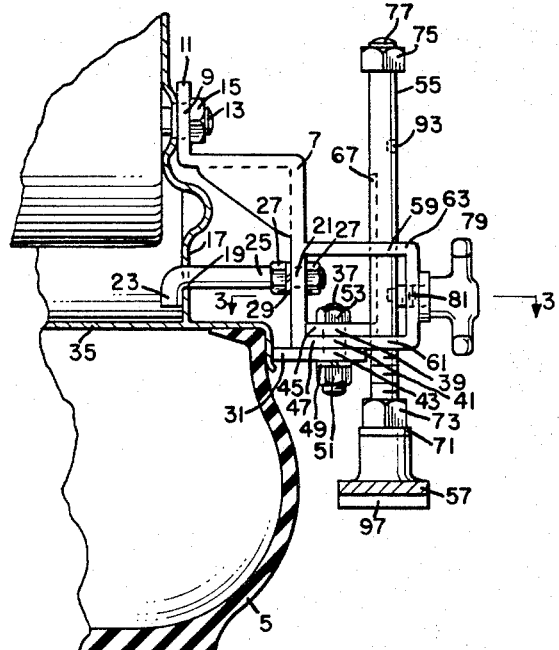
FIG. 2 is a sectional view taken along the line 2—2 of FIG. 1, but with the adjustable tread traction device shown in its retracted position.
Figure 3:
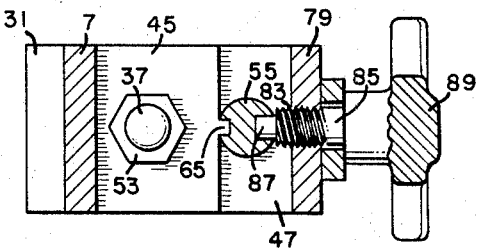
FIG. 3 is a sectional view taken along the line 3—3 of FIG. 2.

End plate 79 is joined to upper bracket plate 63 and lower bracket plate 47, as shown. Tapped hole 81 formed in end plate 79 is engaged by the threaded portion 83 of handle rod 85 having a detent 87 formed on its one end and a handle 89 carried on its other end. Thrust washer 91 is interposed relative to end plate 79 and handle 89. Dented 87 is adapted to engage one of the two detent holes 93 and 95 formed in screw rod 55. When a detent 87 is engaged with detent hole 93, tread will be in its position for use, as shown in FIG. 1. When detent 87 is engaged with detent hole 95, tread 57 will be in its retracted position, as shown in FIG. 2.

Viewing the traction device in FIG. 1 of the drawings, the simplest way to retract load 57 is to unloosen screw 83 sufficiently to release detent 87 from detent hole 93, then rotate wheel 3 180° causing tread 57 to retract fully, and then turn handle 89 sufficiently to cause detent 87 to engage detent hole 95. To position tread 57 in place for use, wheel 3 is rotated to the position shown in FIG. 1, screw 83 is unloosened sufficiently to release detent 87 from detent hole 95 causing tread 57 to radially extend to its maximum position for tread use and then handle 89 is turned sufficiently to cause detent 87 to engage detent hole 93.

Only one adjustable traction device has been shown and described. To provide greater traction, a plurality of traction devices would be utilized with each automobile wheel. The adjustable traction device embodied in this invention can be easily and quickly mounted to or demounted from an automobile by tightening two nuts or unscrewing the two nuts. The cooperation of the tapped hole of tread 57, threaded portion 69 of screw rod 55, lock washer 71 and nut 73 permits tread 57 to be adjusted for varying the amount of tread frictional engagement with the road surface. Even if a plurality of traction devices was carried on each automobile wheel, from the previous description of the attributes of the function of the traction devices, it should be obvious that several traction devices can be mounted and carried on each automobile wheel without interference.

Steel is the preferred choice of material for the traction device in order to provide and assure strength and structural rigidity to the device.

As shown in FIG. 1, the tread 57 is of arcuate configuration such that its depending teeth 97 are aligned with the tread of tire 5. When the driver operates his vehicle on an icy or slippery, hard-packed-snow roadway, the tread 57 fully extended radially to its position for traction utilization will provide adequate traction assistance to render driving safe and trouble-free. Of course, most passenger vehicles utilize five wheel studs and engaged lug nuts to mount a wheel to the brake drum. It goes without saying that the more traction devices mounted on a wheel, the better will be the traction afforded thereby. Five traction devices mounted on a wheel will afford traction assistance that will be greater and more uniform. When the driver encounters extremely severe icy or slippery road conditions, he can further increase the traction afforded from the traction devices mounted on a wheel by either decreasing the tire pressure to effect more "bite" of the depending teeth 97 with the roadway, or by extending the tread 57 downwardly a greater distance to accomplish the same purpose.

A transcending feature of this traction device of gravity utilization to accomplish radial emplacement of the tread for traction assistance and to accomplish radial retraction of the tread allows the driver to operate his vehicle under changing roadway conditions of hard-packed snow and ice to bare pavement with a minimum of time and effort required to adapt the traction device to these changing roadway conditions encountered during wintertime driving.

To further point out and demonstrate the improvement of the traction device of this invention, a discussion of tire chains for traction assistance appears to be appropriate. Tire chains are difficult to mount on a tire; tire chains dig into and cut up a tire; tire chains break easily and when a tire chain cross-link breaks it not only slaps against the fender interior, but makes a lot of noise; and when a driver changes from an icy or hard-packed roadway to dry pavement, he must immediately stop and take off the chains, otherwise the dry pavement will frictionally wear, weaken and eventually break the cross-links.

Having thusly described my invention, I claim:

1. A traction device for use with an automobile tire and wheel comprising a mounting bracket, an L-shaped hook, a screw threaded rod and a tread; said mounting bracket having a small leg adapted for retentive securement to a wheel stud engaged by a lug nut, said mounting bracket carrying said L-shaped hook, said L-shaped hook being adapted for retentive engagement with said wheel, said mounting bracket carrying said rod, said rod carrying said tread, said rod being movable in one radial direction for emplacement of said tread for traction utilization, said rod being movable in an opposite radial direction for retraction of said tread from traction utilization, said mounting bracket carrying a key, said rod having a longitudinal key slot, said key engaging said key slot, said mounting bracket carrying a detent, said screw rod having detent holes, and said detent being adapted for locking engagement with one of said detent holes in the emplacement position of said tread for traction utilization and said detent being adapted for locking engagement with the other of said detent holes in the retraction position of said tread from traction utilization.

2. A traction device in accordance with claim 1, wherein said L-shaped hook has a small leg and wherein said small leg is adapted to retentatively engage a hole formed in said wheel.

3. A traction device in accordance with claim 1, wherein said mounting bracket carries an abutment plate and wherein said abutment plate is adapted to engage the wheel rim open face in abutting relationship.

4. A traction device in accordance with claim 1, wherein said mounting bracket has upper and lower bracket plates, wherein said bracket plates have holes complemental to said rod, and wherein said rod is disposed through said complemental holes.

5. A traction device in accordance with claim 1, wherein said mounting bracket carries a key plate and wherein said key plate has said key.

6. A traction device in accordance with claim 1, wherein said mounting bracket has an end plate, carrying a handle rod, and wherein said handle rod has a handle on one end and said detent on the other end.

References Cited

UNITED STATES PATENTS

| 1,777,964 | 10/1930 | Dunster | 301—40 |
| 1,908,692 | 5/1933 | Connell | 301—50 X |
| 2,292,281 | 8/1942 | Merolo | 301—50 X |
| 2,816,801 | 12/1957 | Read | 301—47 |

FOREIGN PATENTS 552,203 3/1943 Great Britain.

OTHER REFERENCES

Agria, Werke, German printed application, December 1959, 2 sheets drwg., 3 pp. spec.

RICHARD J. JOHNSON, *Primary Examiner.*